United States Patent
Adey et al.

(10) Patent No.: US 6,569,563 B2
(45) Date of Patent: May 27, 2003

(54) AIR DEPOLARIZED ELECTROCHEMICAL BUTTON CELL

(75) Inventors: Robert Adey, South Shields (GB); John David Burns, Newton Hall Estate (GB); John Edward Oltman, Mount Horeb, WI (US)

(73) Assignee: Rayovac Corporation, Madison, WI (US)

(*) Notice: Subject to any disclaimer, the term of this patent is extended or adjusted under 35 U.S.C. 154(b) by 292 days.

(21) Appl. No.: 09/758,976

(22) Filed: Jan. 12, 2001

(65) Prior Publication Data
US 2001/0001369 A1 May 24, 2001

Related U.S. Application Data

(62) Division of application No. 09/168,556, filed on Oct. 8, 1998.

(51) Int. Cl.$^7$ .................................................. H01M 2/02
(52) U.S. Cl. ........................................ 429/163; 429/164
(58) Field of Search .......................... 429/66, 67, 162, 429/163, 164, 172, 175, 176; 72/47, 334, 336, 347

(56) References Cited

U.S. PATENT DOCUMENTS 6,270,921 B1 * 8/2001 Kaplan et al. .............. 429/163

* cited by examiner

Primary Examiner—Patrick Ryan
Assistant Examiner—M. Wills
(74) Attorney, Agent, or Firm—Quarles & Brady LLP

(57) ABSTRACT

Cathode cans for use in air depolarized cells, and cells made with such cans. The side wall is stronger than the bottom wall, and has a smoother outwardly-disposed surface than the respective bottom wall surface. Strength, and thus hardness, of the side wall relates to strength, and thus hardness, of the bottom wall, as hardness of 130–185 relates, to hardness of 93–117, on the Vickers scale. Preferred hardness of the side wall is about 130 to 185; and of the bottom wall is about 93 to 117. The side wall is drawn, and an outwardly-disposed surface of the side wall is ironed. As ironed, the surface finish is related to surface finish of the bottom wall, at the same stage, as surface finish $R_A$ of less than 2, preferably about 0.5 to about 1.5, microinches, is related to surface finish $R_A$ of about 2 to about 5, preferably about 2.5 to about 4.5, microinches. Thickness of the side wall is generally up to about 85 percent as great as thickness of the bottom wall. In methods of forming cathode cans in a metal strip, a die has an initializing land, an inner side wall, a cavity inwardly of the inner side wall, and a lip between the initializing land and the inner side wall.

29 Claims, 4 Drawing Sheets

AIR DEPOLARIZED ELECTROCHEMICAL BUTTON CELL

CROSS REFERENCE TO RELATED APPLICATIONS

This application is a division of and claims priority under 35 U.S.C. 120 to application Ser. No. 09/168,556 filed Oct. 8, 1998, which is incorporated herein by reference in its entirety.

FIELD OF THE INVENTION

This invention relates to air depolarized alkaline electrochemical cells. Typically, such cells have metal-containing anode materials, and air cathodes, and are commonly known as metal-air cells. More particularly, this invention relates to the composition and structure of cathode cans utilized in such cells, and in general to the cells, themselves. The invention addresses the efficiency of use of the three-dimensional volume available, in electrical appliances, for use by such cells. The invention particularly addresses efficient use of non-reactive e.g. structural material in preserving as much space as possible for occupation by the electrochemically reactive anode material used by the cell for generating electrical energy. Increased efficiency of use of non-reactive material provides an increase in the fraction of the overall volume of the cell which can be allocated to, or occupied by, the electrochemically reactive anode material.

BACKGROUND

The growth in use of small electrically-powered devices has increased the demand for very small metal-air electrochemical cells. Metal-air cells have gained significant popularity because only the anode reaction material need be packaged in the cell. In combination, the cathode reaction material is oxygen, which is drawn from the surrounding ambient environment.

Such small cells are usually disc-like or pellet-like in appearance, and are about the size of garment buttons. These cells generally have diameters ranging from less than 5.8 millimeters to about 25 millimeters, and heights ranging from less than 2.0 millimeters up to about 15 millimeters. The small size of such cells, and the limited amount of electrochemically reactive material which can be contained in such small metal-air cells, result in a need for improving the efficiency and completeness of the electrochemical reactions, which are used in such cells for generating electrical energy, and for improving the fraction of the overall volume of such cell which can be occupied by the electroactive anode material.

Such metal-air cells take in atmospheric oxygen, and convert the oxygen to hydroxyl ions in the air cathode by interaction with aqueous alkaline electrolyte. The hydroxyl ions then migrate to the anode, where they cause the metal contained in the anode to oxidize. Usually the active anode material in such cells comprises zinc, although a variety of other operable anode materials are well known to those skilled in the art.

More particularly, the desired reaction in the air cathode of a metal-air cell involves the reduction of oxygen, the consumption of electrons, and the production of hydroxyl ions. The hydroxyl ions migrate through the aqueous alkaline electrolyte toward the anode, where oxidation occurs, forming zinc oxide.

In typical metal-air cells, air enters the cell through one or more air ports in the bottom the cathode can. The port or ports extend through the bottom wall of the cathode can, and may be immediately adjacent the cathode assembly, or may preferably be separated from the cathode assembly by an air reservoir, which is typically occupied by an air diffusion member.

In such arrangements, the port facilitates movement of air through the bottom of the cathode can and to the cathode assembly. At the cathode assembly, the oxygen in the air reacts with water as a chemically reactive participant in the electrochemical reaction of the cell, and thereby forms the hydroxyl ions.

Since the overall electrochemical capacity of any electrochemical cell is to some extent determined by the quantity of electrochemically reactive materials which can be loaded into the cell, it is important to maximize, in the cell, the size of the cavity which is devoted to containing the electrochemically reactive materials. In the case of a metal-air cell, contained reactive material is limited to the anode material.

In general, the size of any given cell is limited by the inside dimensions of the space provided in the article, namely the appliance, in which the cell will operate. For example, the size of a hearing aid cell is limited to the internal dimensions of the space, provided for the cell, in the hearing aid appliance. The internal dimensions of the space are determined by the hearing aid manufacturer, not the power cell manufacturer.

Thus, any given appliance includes a limited amount of gross space or volume allotted to occupancy by the electrochemical cell which powers the appliance. That gross space may ultimately be divided according to four functions, all competing for portions of the gross space. A first portion of the space is used to provide clearance between the interior elements of the space and the exterior elements of the electrochemical cell.

A second portion of the space is occupied by the structural and otherwise non-reactive elements of the electrochemical cell.

A third portion of the space is allocated for occupation by the electrochemically reactive material in the electrochemical cell, and, in a metal-air cell, especially the anode material.

Finally, a fourth portion of the space, as appropriate, can sometimes be described as "wasted" space, because it serves none of the above first through third functions. Such wasted space is typically found outside the cell, e.g. at corner locations, where the corner of the cell is less square than is structurally feasible, thereby wasting volume that potentially might be occupied, either directly or indirectly by electrochemically reactive material. Such wasted space might also be considered to be included in the space allocated to clearance because such space is typically located outside the cell.

Any increase in the third portion of the space, namely the cavity in the anode can which cavity is allocated to the anode material, is necessarily gained at the expense of one or more of the other three portions of the fixed volume allocated for occupation by the cell, namely the first clearance portion, the second portion devoted to the non-reactive elements of the cell, or any fourth waste portion. Thus, it is important to identify the first, second, and fourth portions of the overall space, and, where possible, to reduce the amount of space devoted to such uses. To the extent such uses can be reduced, the space so recovered can, in general, be allocated for use to hold additional amounts of electrochemically reactive anode material, thereby increasing the potential overall capacity of the cell to generate electrical energy within the limited amount of gross space or volume provided, in the appliance, for occupation by the cell.

Overall cell height and width dimensions are specified by the International Electrotechnical Commission (IEC).

Of the first, second, and fourth portions of the cell, the opportunity for capturing space from the first portion, devoted to clearance, relates in part to the ability of the manufacturer to control the range of outer diameters of the cathode cans from which the cells are made. To the extent the range of diameters can be reduced, nominal clearance may be reduced accordingly.

It is known that traditional methods of forming cathode cans for use in hearing aid cells have a tendency to form an outward bulge in the diameter of the cathode can at the intersection of the side wall with the bottom wall, whereby allowance must be made in the can specification for occurrence of such bulge.

In addition, applicants have concluded that further potential for recovering space for use in holding anode material, and thus to increase volume efficiency of the cell, lies primarily in the second portion of the cell, namely the structural and otherwise non-reactive elements of the cell. These elements generally comprise the cathode can, the anode can, the seal, and the cathode assembly, these typically representing all of the major structural elements of the cell. Thus, to get more space from the second portion of the cell, that space must be taken from the anode can, the cathode can, the cathode assembly, or the seal, or some combination of these.

This invention focuses on apparatus, methods, and materials for providing improved cathode cans, and wherein the cathode cans have reduced cross-section thicknesses, and reduced range of thicknesses from can to can, while maintaining suitable strength parameters to properly support the manufacture and use of such cans, and cells made therewith. Such cans typically have a pair of nickel layers, and a steel layer between the nickel layers.

It is known to desire to reduce the thickness of the non-reactive structural materials of the cell. However, the desire to reduce the thickness of such non-reactive elements operates in tension against the requirement that such structural elements have suitable fabrication properties, and suitable strength to support the fabrication and use of the cell. Accordingly, an element cannot simply be made thinner without considering the effect such thinning will have on the ability to fabricate the element, or to fabricate and use a cell made therewith.

Similarly, it is known to select different materials from which to fabricate the respective non-reactive elements. Such different materials may have different chemical composition, or different chemical or physical properties. However, changing material selection also affects the ability to fabricate the element, and the ability of the element to support fabrication and use of the cell.

Thus, where thinner, or harder, metal strip is contemplated for use to form cathode cans, there is the prospect of developing cracks in one or more of the layers of the metal strip during conventional fabrication of the can.

Accordingly, any change in selection of material from which the cans are to be made, or physical dimensions of such material, must be carefully balanced against the fabrication requirements associated with such material as the material is used to fabricate the respective elements; as well as the requirements associated with fabrication and use of a cell utilizing such elements. Any change of material must, of course, be compatible with the chemical operating environment within which the cell operates. Typically, air depolarized cells operate in an alkaline environment, and so any material used therein must be compatible with such environment.

It is an overall object of the invention to provide improved air depolarized electrochemical button cells.

It is a more specific object of the invention to provide cathode cans wherein the side walls are harder than the bottom walls.

It is yet another object to provide cathode cans wherein outwardly-disposed side walls have smoother finishes than corresponding surfaces of the respective bottom walls.

It is still another object to provide can forming systems including a punch and a die wherein the clearance between the punch and die is less than the thickness of a metal strip to be formed therebetween.

Yet another object is to provide methods of making cathode cans in a metal strip, wherein the clearance between the punch and the die is less than the thickness of the metal strip.

It is a further object to provide cathode cans wherein the side wall is harder than, and thinner than, the bottom wall, and wherein an outwardly-disposed surface of the side wall has a smoother finish than a corresponding outwardly-disposed surface of the bottom wall.

SUMMARY OF THE DISCLOSURE

The invention, in general, comprehends a cathode can, for use in an air depolarized electrochemical cell, the cathode can comprises a bottom wall, and a circumferential side wall, extending upwardly from a lower edge of the side wall adjacent the bottom wall, and terminating at an upper, distal edge. The side wall has a height generally corresponding to an overall height of the cathode can of no more than about 15 mm, preferably no more than about 8 mm, and a circumference defining an overall diameter of the cathode can of no more than about 25 mm, preferably no more than about 13 mm. The ratio of the overall height to the overall diameter of the cathode can is about 0.1/1 to about 1/1. The side wall has a first strength, as measured by hardness, greater than a second strength, as measured by hardness, of the bottom wall. The strength of the side wall is related to the strength of the side wall as a side wall hardness of about 130 to about 185 Vickers (84–90 on the Rockwell Hardness 15T scale) is related to a bottom wall hardness of about 93–117 Vickers (77–82 on the Rockwell 15T scale).

The ratio of the hardness of the side wall to the hardness of the bottom wall, on the Vickers scale, is preferably between about 0.60/1 and about 0.85/1.

Preferred absolute hardness of the side wall is about 130 to about 185 on the Vickers scale and about 84 to about 90 on the Rockwell Hardness 15T scale; and preferred hardness of the bottom wall is about 93 to about 117 on the Vickers scale and about 77 to about 82 on the Rockwell 15T scale.

The cathode can side wall preferably has an outwardly-disposed ironed surface. The outwardly-disposed side wall surface, as ironed, comprises a first surface finish. The bottom wall has a second surface finish. The surface finish of the side wall is preferably related to the surface finish of the bottom wall as a surface finish $R_A$ of less than 2 microinches is related to a surface finish $R_A$ of about 2 microinches to about 5 microinches.

In preferred embodiments, the bottom wall has a first thickness, the side wall having a second thickness no more than about 85 percent as great as the thickness of the bottom wall.

Preferred embodiments of the can comprise first and second layers comprising nickel, and a layer of steel between the nickel layers, and can include a metal plating layer on at least one of the nickel layers such that the respective nickel layer is between the plating layer and the steel layer.

For use in air depolarized electrochemical cells, a respective cathode can includes at least one air port in the bottom wall.

The invention further comprehends an air depolarized electrochemical button cell having an overall height of no more than about 15 mm, preferably no more than about 8 mm, and a circumference defining an overall diameter of the cathode can of no more than about 25 mm, preferably no more than about 13 mm, the cell comprising an anode assembly, a cathode including a cathode can having a hardened side wall as described above, a separator, and an electrolyte.

In a second family of embodiments, the invention comprehends a cathode can having a bottom wall, and a circumferential side wall, extending upwardly from the bottom wall. The side wall has a height generally corresponding to an overall height of the cathode can of no more than about 15 mm, preferably no more than about 8 mm, and a circumference defining an overall diameter of the cathode can of no more than about 25 mm, preferably no more than about 13 mm. The ratio of the overall height to the overall diameter of the cathode can is about 0.1/1 to about 1/1. The side wall has an outwardly-disposed ironed surface. The side wall surface, as ironed, comprises a first surface finish. The corresponding outer surface of the bottom wall has a second surface finish. The surface finish of the side wall is related to the surface finish of the corresponding outwardly-disposed surface of the bottom wall as a surface finish $R_A$ of less than 2 microinches is related to a surface finish $R_A$ ranging from about 2 microinches to about 5 microinches.

In some embodiments, the surface finish of the side wall ranges from about $R_A$ 0.5 microinch to about $R_A$ 1.5 microinches and the surface finish of the bottom wall ranges from about $R_A$ 2.5 microinches to about 4.5 microinches.

In preferred embodiments, the cathode can comprises first and second layers comprising nickel, and a layer of steel between the nickel layers, and may optionally include a metal plating layer on at least one of the nickel layers such that the respective nickel layer is between the plating layer and the steel layer; and typically includes at least one air port in the bottom wall.

This second family of embodiments further comprehends an air depolarized electrochemical button cell having an overall height of no more than about 15 mm, preferably no more than about 8 mm, and a circumference defining an overall diameter of the cathode can of no more than about 25 mm, preferably no more than about 13 mm, the cell comprising an anode, a cathode including a cathode can having a surface finish as described above, a separator, and an electrolyte.

A third family of embodiments of the invention comprehends a method of forming a cathode can from a metal strip having a first thickness between opposing surfaces thereof, using a punch in combination with a female die. The female die comprises an initializing land, an upstanding inner side wall, a cavity defined inwardly of the inner side wall, and a lip between the initializing land and the inner side wall. The method comprises urging the punch against an element of the metal strip and thus urging both the punch and the metal strip into the cavity in the female die such that the metal strip is disposed between a first outer surface of a side wall of the punch, and a second inner surface of the side wall of the female die. The metal is thus drawn about the lip of the female die. The lip of the female die comprises a first outer cross-sectional radius disposed toward the initializing land, and a second inner cross-sectional radius disposed toward the inner side wall. The first radius is disposed between the second radius and the initializing land. The second radius is smaller than the first radius and is disposed between the first radius and the inner side wall.

This embodiment further comprehends moving the punch, and the corresponding element of the metal strip, into the cavity such that the outer side wall of the punch comes into facing, and thus working, relationship with the inner side wall of the female die. The clearance between the respective inner and outer side walls is less than the thickness of the metal strip being drawn therebetween, whereby movement of the punch into the cavity and corresponding drawing of the metal strip, along with the punch, and into sliding engagement against the inner surface of the side wall, results in rubbing, surface-to-surface engagement of an outwardly-disposed surface of the metal strip against corresponding portions of the inner surface of the female die, thus drawing the metal strip, and working the surface of the metal strip, thereby making a cathode can precursor as an integral part of the metal strip, the cathode can precursor having a bottom wall, and a side wall extending upwardly from the bottom wall.

This embodiment further comprehends, subsequent to the moving of the punch into the cavity, severing the cathode can precursor from the metal strip, thereby to form the cathode can.

Leading and trailing edges of the element, or workpiece, being worked are cut transversely across the metal strip before the metal strip is urged into the die cavity, while retaining attachment of the element to the metal strip at opposing sides of the strip.

In general, the moving of the punch into the cavity works the metal strip by both thinning the metal and bending the metal. Such preferably cold working of the metal strip at the outwardly-disposed surface increases the smoothness of the outwardly-disposed surface of the metal strip.

In preferred embodiments, the bottom wall of the cathode can precursor has a second thickness, and the side wall of the cathode can precursor has a third thickness, of about 60 percent to no more than about 85 percent, preferably about 60 percent to about 80 percent, as great as the second thickness.

In some embodiments, the metal strip comprises first and second layers comprising nickel, and a layer of steel between the nickel layers, and can further include the step of post-plating the cathode can with a plating material, for example and without limitation, nickel, gold, or silver, after the severing of the cathode can precursor from the metal strip, whereby the worked, outwardly-disposed surface is plated with the plating material.

Preferably, the ratio of the second radius to the first radius is about 2/1 to about 8/1, more preferably about 3/1 to about 6/1, and most preferably, about 4/1.

The ratio of the clearance between the punch and the female die to the thickness of the metal strip, before any working of the metal strip in the invention is about 0.5/1 to about 0.85/1.

The metal strip has a preferred hardness of about 93 to about 117 on the Vickers scale prior to being worked in said cavity.

Preferably, that portion of the metal strip which is worked in the cavity has a worked hardness of about 130 to about 185 on the Vickers scale.

The invention further comprehends an air depolarized electrochemical button cell comprising an anode assembly, a cathode including a cathode can fabricated according to an above-recited method, a separator, and an electrolyte.

In a fourth set of embodiments, the invention comprehends a can forming system for forming a cathode can having at least one air port in a bottom wall thereof, from a metal strip. The can forming system comprises a punch in combination with a female die, and a severing device. The female die comprises an initializing land, an upstanding inner side wall extending about a cavity, and a lip between the initializing land and the inner side wall. The lip of the female die comprises a first outer cross-sectional radius disposed toward the initializing land, and a second inner cross-sectional radius disposed toward the inner side wall. The first radius is between the second radius and the initializing land. The second radius is smaller than the first radius, and is disposed between the first radius and the inner side wall. The severing device severs the cathode can precursor from the metal strip, thereby to form the cathode can.

The can forming system can further include the metal strip, having a thickness, and being disposed between the punch and the die as the punch, and the corresponding element of the metal strip, moves into the cavity such that the outer side wall of the punch comes into facing, and thus working, relationship with the inner side wall of the female die. The clearance between respective inner and outer side walls is less than the thickness of the metal strip being drawn therebetween. Thus, movement of the punch into the cavity and corresponding drawing of the metal strip, along with the punch, and into sliding engagement against the inner surface of the side wall results in rubbing, surface-to-surface engagement of an outwardly-disposed surface of the metal strip against corresponding portions of the inner surface of the female die, thus drawing the metal strip and thereby substantially thinning the metal strip, working the metal strip by both substantial thinning of the metal and bending of the metal. The drawing, working, and corresponding thinning of the metal strip gives the outwardly-disposed surface of the metal strip a finer surface finish, and makes a cathode can precursor as an integral part of the metal strip.

The can forming system commonly includes the metal strip having first and second layers comprising nickel, and a layer of steel between the nickel layers.

The metal strip preferably has a hardness of about 93 to about 117 on the Vickers scale prior to being worked by the can forming system.

In preferred embodiments, that portion of the metal strip which is worked in the can forming system has a worked hardness of about 130 to about 185 on the Vickers scale.

Typical cathode can made with the above can forming system comprises a bottom wall, having at least one air port therein, and a circumferential side wall extending upwardly from the bottom wall, the side wall having a height generally corresponding to an overall height of the cathode can of no more than about 15 mm, preferably no more than about 8 mm, and a circumference defining an overall diameter of the cathode can of no more than about 25 mm, preferably no more than about 13 mm.

Figure 1:
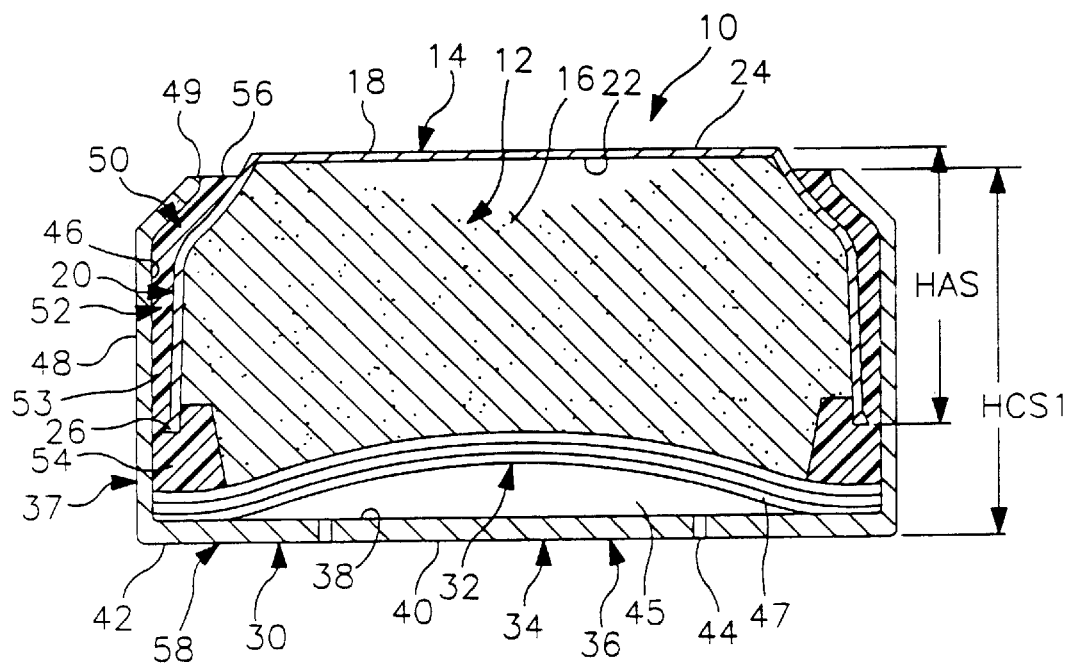
FIG. 1 shows a representative cross-section of an electrochemical cell of the invention.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Referring now by characters of reference to the drawings, and first to FIG. 1, the number 10 refers to an air depolarized button cell of the invention. Cell 10 includes negative electrode 12, also referred to as anode 12. Anode 12 includes an anode can 14 and electrochemically reactive anode material 16 contained generally within the anode can. Anode can 14 has a top wall 18, and circumferential downwardly-depending side wall 20. Top wall 18 and side wall 20 have, in combination, an inner surface 22 and an outer surface 24. Side wall 20 has a height "HAS," shown in FIG. 1, generally corresponding to the overall height of the anode can, and terminates in a distal edge at circumferential anode can foot 26.

Positive electrode 30, also referred to as cathode 30, includes an air cathode assembly 32, contained within cathode can 34. Cathode can 34 has a bottom wall 36, and a circumferential upstanding side wall 37 extending upwardly from the bottom wall. Bottom wall 36 has a generally flat inner surface 38, a generally flat outer surface 40, and an outer perimeter 42 defined on the flat outer surface 40. Bottom wall 36 has a first thickness "T1" between inner and outer surfaces 38 and 40.

As illustrated in FIG. 1, a plurality of air ports 44 extend through bottom wall 36 of the cathode can, providing avenues for transport of oxygen into the cell adjacent cathode assembly 32. Air reservoir 45 spaces cathode assembly 32 from bottom wall 36 and the corresponding ports 44. A porous diffusion layer 47 extends into air reservoir 45. Circumferential side wall 37 of the cathode can extends upwardly from bottom wall 36, terminates at distal edge 49, and has an inner surface 46 and an outer surface 48.

Side wall 37 of the cathode can, as shown in FIG. 1, has a height "HCS1," generally corresponding to the height of the cathode can in FIG. 1. As seen in FIG. 1, height "HAS" of anode can side wall 20 is significantly greater than half the height "HCS1" of the cathode can side wall. Outer surface 40 of bottom wall 36 has a substantially flat portion extending radially outwardly to outer perimeter 42, and radially outwardly of inner surface 46 of side wall 20. Side wall 37 has a second thickness "T2" between inner and outer surfaces 46 and 48.

Anode 12 is electrically insulated from cathode 30 by seal material illustrated by a seal 50. Seal 50 includes a circumferential side wall 52 disposed in space 53 which side wall extends over a substantial portion of height "HAS" between upstanding side wall 37 of the cathode can and downwardly-depending side wall 20 of the anode can. A seal foot 54 is disposed generally between foot 26 of the anode can and cathode assembly 32, and a seal top 56 where side wall 52 of seal 50 extends from between side walls 20 and 37 adjacent the top of the cell. As illustrated in FIG. 1, the anode, including anode can 14 and anode material 16, is received inside the cathode can such that the entirety of the cathode can side wall 37 is disposed radially outwardly of anode can side wall 20.

Outer surface 58 of cell 10 is defined by portions of the outer surface 24 of the top of the anode can, outer surface 48 of side wall 37 of the cathode can, outer surface 40 of the bottom wall of the cathode can, and top 56 of seal 50. Thus, the anode can and the cathode can, in combination, define a top and a bottom of the cell, height "H2" of the cell of no more than about 15 mm, and maximum diameter "W2" of the cell of no more than about 25 mm. The ratio of the maximum height to the maximum diameter ranges from about 0.1/1 to about 1/1. As seen in FIG. 1, height "H2" and maximum diameter "W2" define a right cylinder, representing an overall volume of the cell, generally ranging between about 0.06 cm$^3$ and about 0.60 cm$^3$ for hearing aid applications.

Inner surfaces of anode can 14, cathode assembly 32, and seal foot 54, generally define a cavity 28 which contains the anode material 16. For efficiency of utilization of the space allocated, in the appliance, for occupation by the power cell, cavity 28 should be as large as possible. In general, this invention addresses the materials and structures which affect the degree of efficiency with which cell 10 fills the space, allocated for the power cell in the appliance within which the cell is to be used, with electrochemically reactive materials. Accordingly, the invention addresses materials, structures, and methods for improving the efficiency with which cell 10 fills space in the appliance with electrochemically reactive material.

At cell assembly, closing force is applied to the top and bottom of the cell being assembled. Bottom wall 36 receives a portion of the cell closing force. Such closing force pushes upwardly on the bottom wall, whereby bottom wall 36 tends to be dished upwardly, toward the interior of the cell being formed. Such upward dishing is undesirable for a number of reasons, including, without limitation, that such dishing reduces the usable volume inside the cell, with corresponding reduction in total cell discharge capacity, as well as giving the impression that the cell has been damaged.

It is desirable to maintain bottom wall 36 flat, whereby the bottom wall is not dished inwardly at cell closure. The ability of the bottom wall to resist such inward dishing is related to, among other things, the thickness of the bottom wall, as well as to the material from which the cathode can is fabricated, and the properties of the material used in the bottom wall.

Figure 2:
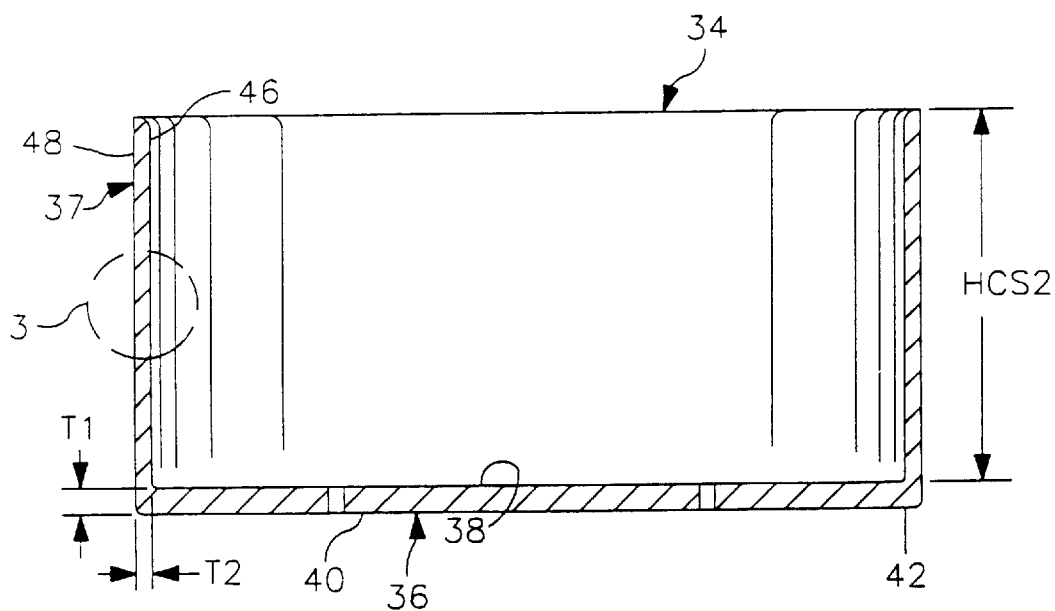
FIG. 2 shows a representative cross-section of a cathode can of the invention.

FIG. 2 illustrates a cathode can 34 after the cathode can is fully fabricated, and prior to the cathode can being assembled with other cell elements to form an air depolarized button cell. As illustrated in FIGS. 1 and 2, thickness "T1" of the bottom wall is greater than thickness "T2" of the side wall. Height "HCS2" of side wall 37 generally corresponds to the overall height of can 34, and is greater than "HCS1" of the crimped can in FIG. 1.

Figure 3:
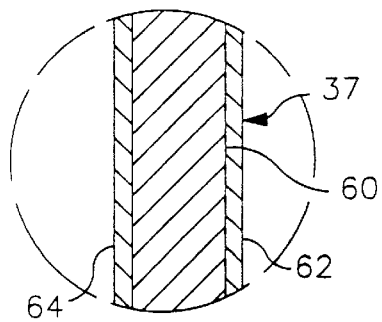
FIG. 3 shows an enlarged representative cross-section of the side wall of the can of FIG. 2, and is taken at the dashed circle labeled 3 in FIG. 2.

FIG. 3 illustrates a typical cross-section of side wall 37. As illustrated there, a core layer 60 of steel, preferably cold rolled steel, is disposed between an inner layer 62 of nickel and an outer layer 64 of nickel. Inner layer 62 defines inner surface 46 of the illustrated side wall 37, and outer layer 64 defines the outer surface 48 of the illustrated side wall. In some embodiments, additional layers, for example a post-plated layer of nickel can be used inwardly and/or outwardly, respectively, of layers 62 and 64. As used herein, "inwardly" and "outwardly" refer to what become inward and outward with respect to a cell when the cathode can is assembled thereinto.

Figure 4:
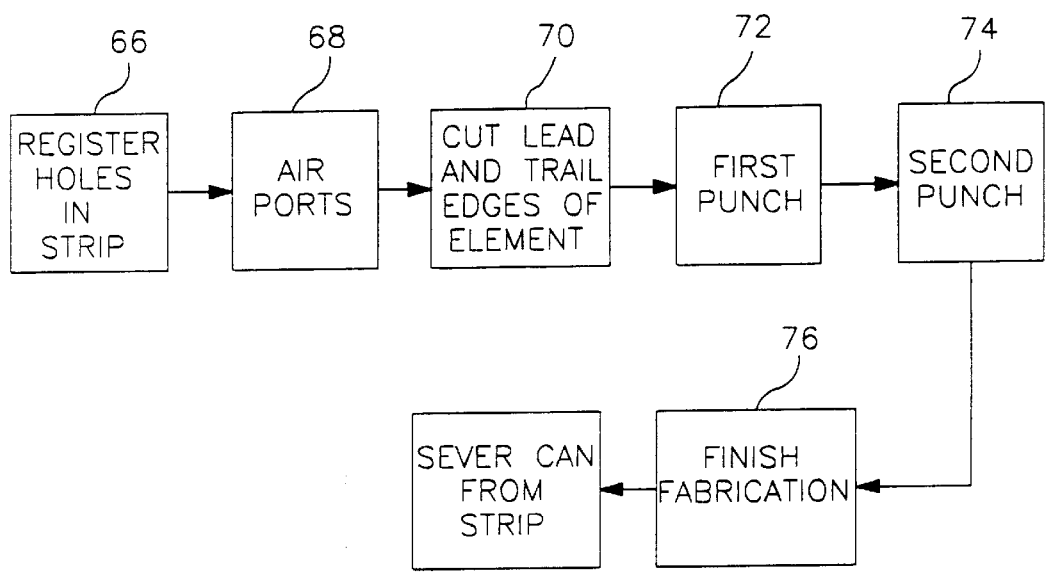
FIG. 4 is a block diagram illustrating the overall process of making cathode cans of the invention.

FIG. 4 is a block diagram representation of the overall process of fabricating cathode cans 34 according to the invention. Referring now to specific processes, and to the blocks representing such processes, a generally endless strip of metal having the above described three or more layer structure is fed into a processing line for fabrication of cathode cans. At step 66, registration holes are formed in the metal strip, out of the way of forming cathode cans therefrom. At step 68, air ports are fabricated in the metal strip in registration with the registration holes, at locations which will become the bottom walls of respective cathode cans made therewith.

At step 70, leading and trailing edges of workpiece elements, respective pairs of which will define separate cathode cans, are cut transversely across the metal strip, while retaining attachment of the respective workpiece elements to the metal strip at opposing sides of the strip. At the conclusion of the work performed at step 70, individual, generally circular, work piece elements have been defined in the strip, in registration with the registration holes and the air ports, with suitable cuts at each work piece element to allow the work piece element to be further fabricated into a can. Thus, the work piece is connected to the continuous metal strip by suitable attachment ribbons (not shown) along the metal strip.

Step 72 represents the novel first punch step of the invention wherein the flat work piece element is first fabricated into the shape of a cup or can, as a cathode can precursor. Punch lubricants are, of course, used in the conventional manner. Step 74 represents the second punch step of the invention wherein the cathode can precursor is further fabricated to the preferred configuration of cathode cans of the invention.

Further finish fabrication such as coining and flaring of the top of the cathode can is performed at step 76. Finally, the completed can is severed from the metal strip at step 78.

Figure 5:
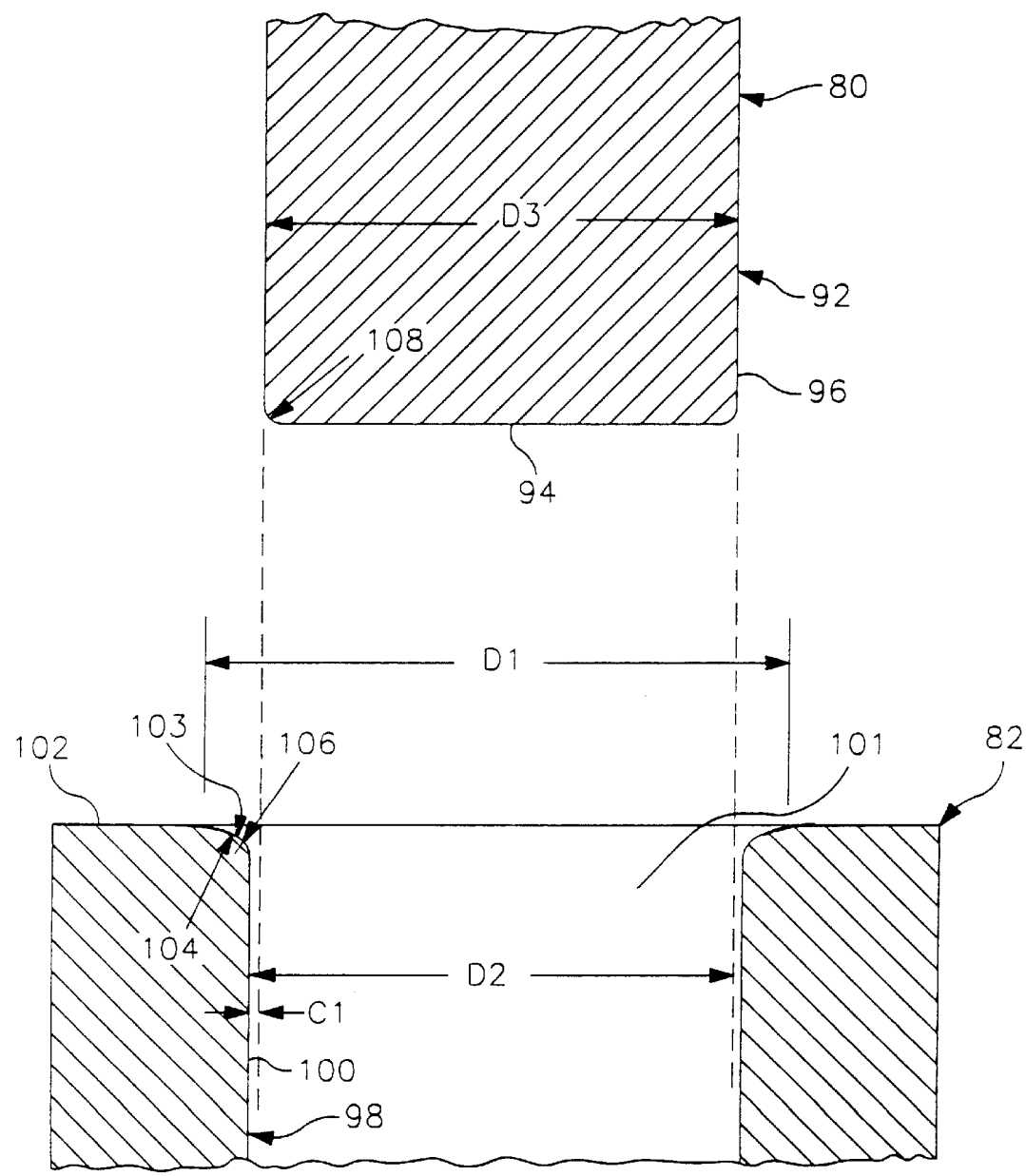
FIG. 5 shows an elevation, in cross-section, illustrating the relative positioning of the first punch and the first die, at the first punch station.
Figure 6:
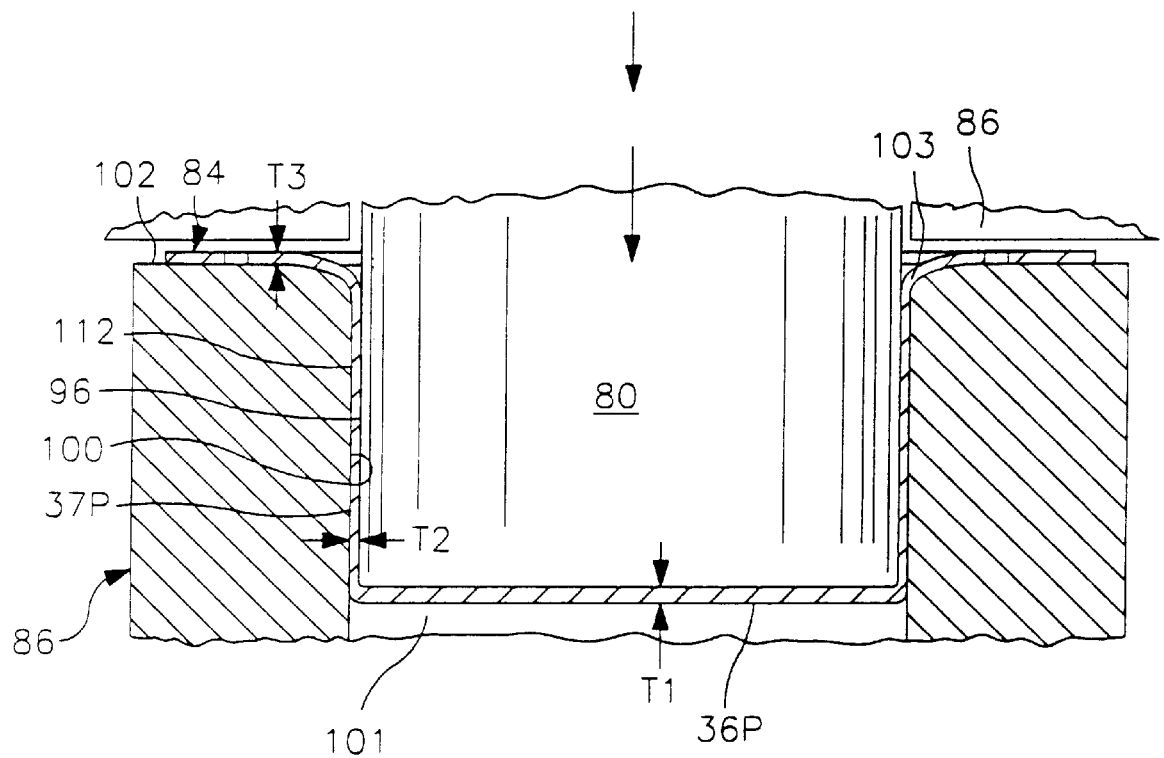
FIG. 6 shows the punch having moved, along with the metal element, down into the die, thus to draw the metal into the die and to form the metal about the punch.

Referring now to FIGS. 5 and 6, and first punch step 72, punch 80 is aligned over female die 82. Metal strip 84 is disposed between punch 80 and female die 82. Stripper die 86 is disposed about punch 80 so as to strip the work piece off of punch 80 as punch 80 is retracted from female die 82. As illustrated, metal strip 84 has a thickness "T3" of, for example, about 0.15 mm.

Referring now to FIG. 6, punch 80 has an elongate side wall 92, and a bottom wall 94. Side wall 92 has an outer surface 96. Correspondingly, female die 82 has an elongate side wall 98 having an inner surface 100 facing cavity 101. A lip 103 is disposed between initializing land 102 and inner surface 100. Lip 103 includes an outer radius 104, and an inner radius 106 between outer radius 104 and inner surface 100. As illustrated, inner radius 106 is substantially smaller than outer radius 104. The ratio of the outer radius to the inner radius is about 2/1 to about 8/1. Preferably, the radius is about 3//1 to about 6/1. The illustrated radius ratio is about 4/1.

The fabrication process illustrated in FIGS. 5–6 illustrates fabricating a cathode can for a size 312 (PR41) air depolarized button cell. In that regard, the outer radius at lip 103 is about 0.75 mm to about 1.5 mm, and the inner radius is about 0.1 mm to about 0.5 mm. The diameter "D1" of the outer edge of the outer radius is about 8 mm to about 10 mm. The inside diameter "D2" of cavity 101, again for a PR41 cell, is about 7.68 mm to about 7.76 mm. The outside diameter "D3" of the outer surface of punch 80 is about 0.04 mm to about 0.055 mm. less than the diameter of the inner surface of the die.

The clearance "C1" between outer surface 96 of punch 80 and inner surface 100 of cavity 101, which in FIG. 6 corresponds to "T2," is accordingly configured to be less than the thickness "T3" of metal strip 84 prior to working the metal strip. Namely, clearance "C1" is typically about 65% to about 80%, preferably no more than about 85%, of the thickness of metal strip 84. Accordingly, clearance "C1" between punch and die is about 0.04 mm to about 0.055 mm less than the unworked thickness of the metal strip.

EXAMPLE

Referring to FIGS. 5–6, as punch 80 moves toward and into cavity 101, bottom wall 94 of the punch engages the top surface of the respective work piece element of metal strip 84, and pushes the work piece element into cavity 101 ahead of the bottom wall.

As the punch enters the cavity, the clearance between the outer surface of the punch and the inner surface of side wall 98 of the die is less than the thickness of the metal strip. Accordingly, as the metal strip is punched into the cavity, the metal strip is necessarily thinned.

The mechanism for thinning the metal strip is set up by the utilization of the double radius lip 103 which defines the intersection of initializing land 102 and inner side wall 98. Applicants have discovered that a single small, or tight, radius as at 106 is satisfactory for creating a desired shape for the can, but risks tearing or cracking the metal being so formed; and that a single larger radius as at 108 forms without metal failure, but does not create the desired shape for the can. By contrast, the double radius structure fabricates a satisfactory can shape while satisfactorily attenuating risk of metal failure during this first punch step 72.

As the metal is punched into cavity 101, that metal which is juxtaposed in front of bottom wall 94 is simply pushed ahead of the punch, without significant change in thickness of the metal. The metal which is drawn down along side walls 92, 98 is stretched about lip 103, successfully thinning the metal to a thickness operative to traverse the clearance between the punch and the die, thereby to create the cathode can precursor by taking the first step in fabricating the three-dimensional can shape.

In addition, as punch 80 moves downwardly into cavity 101, outer surface 112 of the metal strip is in sliding, frictional engagement against inner surface 100 of side wall 98. Namely, the outer surface of the metal strip material is cold-worked by the sliding of the outer surface of the metal strip along the interface of the metal strip with side wall 98 of die 82. In the process, the metal strip is under tension from the leading of bottom wall 94 of the punch, and is simultaneously under the compressive force of side walls 92 and 98 urging thinning of the metal strip in order to fit into the clearance between punch and die in cavity 101.

As the metal strip thus advances into cavity 101, and the outer surface of the metal strip is in sliding engagement with the inner surface of cavity 101, outer surface 112 of the side wall precursor 37P is worked by side wall 98 of the die. Side wall 98 is, of course, highly polished in order to properly work metal strip 84 and to impart a desirable polished finish to the side wall. Typical finish on inner surface 98 is less than 2 microinches, whereas typical finish on metal strip 84 and bottom wall 36P of the can precursor, is greater than 2 microinches, such as up to 5 or more microinches.

Such working of surface 112 accomplishes two results. First, the cold working results in hardening of the metal strip, especially at and adjacent outer surface 112. Second, the cold working against the highly polished side wall 98 creates a highly polished surface finish on side wall 112, such that the surface finish of side wall 112 is substantially smoother than metal strip 84, and smoother than bottom wall precursor 36P. Assuming a surface finish $R_A$ of about 2 microinches to about 5 microinches for metal strip 84, the resulting surface finish $R_A$ of an exemplary side wall 37 is less than 2 microinches, preferably less than 1.5 microinches. In highly preferred embodiments, the surface is such as to measure less than 1 microinch. In some embodiments, the finish is so smooth as to make it difficult to detect any surface finish measurement on an instrument having a sensitivity to $R_A$ 0.1 microinch.

By the end of the punch stroke at step 72, the first punch step has transformed the flat, disc-like work piece element into a cup or can having substantially, though not entirely, the full height "HCS1" of the finished cathode can of the invention. Namely, the height of the can at the completion of the first punch stroke is within a few thousandths of an inch of the finished height "HCS1."

Also by the end of the first punch stroke at step 72, the ironing of the outer surface of the side wall, between the punch and the die, is occurring simultaneously over substantially the full height of the side wall, from the bottom wall 94 of the punch up to the inner radius 106.

After completion of the punch stroke illustrated in FIGS. 5 and 6, punch 80 is withdrawn, and the can precursor so formed is stripped from the punch by stripper die 86. The work piece then moves on to second punch step 74. At step 74, the inner diameter of the cavity is larger than at the first step, and the outer diameter of the punch is smaller than punch 80 in the first step. Operation of the second punch tightens the radius of the metal about lip 103, and further forms a sharper corner at the joinder of the bottom wall and the side wall of the cathode can precursor.

Accordingly, in the preferred illustrated embodiment of the processes of the invention, ironing occurs only in combination with drawing. Further, in accord with the preferred embodiments, fabrication of substantially the full height of the cathode can is accomplished only in combination with steps wherein the punch moves toward the female die.

Yet further, the step which performs the ironing commences with or from the work piece element in a flat disc-like configuration.

The hardness and formability of the metal strip represent compromises between the need to form the strip in making the cathode can and the need to crimp the distal edges of side wall 37 in closing the cell at final assembly, and the corresponding desire to obtain as much strength as possible from a minimum material thickness.

A preferred metal strip includes a core layer of cold rolled steel, plated on opposing surfaces with layers of nickel, each of the layers being about 0.00165 mm to about 00.215 mm thick. The plated three-layer structure is preferably but not necessarily diffusion annealed such that the nickel layers are diffusion bonded to the core layer. The diffusion annealed three-layer strip is then temper rolled to specified thickness which, in the preferred embodiment herein is about 0.15 mm.

As referred to in TABLE 1 following, and elsewhere herein, unless noted otherwise, the nomenclature used for Temper of the metal strip is adapted from the Special Temper designation suggested by supplied Thomas Steel Strip Corporation, Warren, Ohio, USA, from whom such metal strip can be obtained. The preferred such metal strip is designated Temper "3 Special" by Thomas Steel Strip. A similarly desirable material is available from Hille & Muller, Dusseldorf, Germany, under the temper designation "LG." Table 1 illustrates properties of a preferred metal strip having the preferred "3 Special" temper designation, as well as an alternative material having a "4" temper designation. Both temper "3 Special" and temper "4" are acceptable for forming cathode cans of the invention. Other temper designations may be acceptable, for example where the steel composition is correspondingly adjusted.

TABLE 1

| Property | Inv. Ex. #1 | Inv. Ex. 2 |
| --- | --- | --- |
| Temper Number | 3 Special | 4 |
| Grain Size, ASTM E112-88 | 7–12 | 9–12 |
| Yield Strength | 45–52 ksi | 32–45 ksi |
| Elongation, Nm, 80–100 mm width | 25% | 35% |
| Hardness, Vickers | 93–117 | 93–117 |
| Erichsen Ductility ASTM E643-84 | ≦7.5 mm | ≦9.5 mm |

The physical properties in TABLE 1 suggest that the metal strip 84 of Inv. Ex. #1 should be harder and less formable than the conventional battery grade metal strip illustrated as Inv. Ex. 2. Yet battery-forming experiments by the inventors herein show that either material is suitable for making cathode cans, and cells made therewith, using methods disclosed herein.

The composition of preferred steel layer 60, and as in the examples indicated in Table 1, is AISI 1008, which is less than 0.1 percent by weight carbon. Other steels can be used so long as they satisfy the above noted formability and strength requirements.

A significant advantage of the apparatus and processes disclosed herein is that the resulting cathode can has a relatively thicker bottom wall 36 and a relatively thinner side wall 37. Starting with a 0.152 mm thick metal strip, bottom walls of cans made according to the invention are about 0.152 mm thick, with modest variation.

By comparison, the stretched and polished or ironed side walls 37 are about 0.105 mm thick, reflecting the dimension of the clearance between punch and die in the first punch step. Thus, the greater thickness of the bottom wall benefits the need for thickness to provide strength in the bottom wall, while the lesser thickness in the side wall provides adequate strength for two reasons. First, the side wall is subjected primarily to in-line stresses that travel along the direction of extension of the side wall. Second, the side wall is strengthened, toughened, such as by hardening, by the working of the metal as the side wall is thinned.

By so thinning the side wall, the absolute amount of space taken up by the side wall is reduced, whereby the grommet and anode cans can be specified with correspondingly larger inner diameters, with the result that the space occupied by the anode cavity is correspondingly enlarged. The enlargement of the anode cavity increases the capacity of the anode cavity to receive additional electroactive anode material, whereby the electrical watt-hour capacity of the cell is increased.

A further advantage of the can forming system, and methods, of the invention is that the bottom corner of the cathode can is formed by a stretching process, rather than a purely punching, compressive process, whereby there is no tendency for the bottom corner of the can to bulge outwardly. Accordingly, no allowance need be made in the specification for bulging cans, whereby the specification range for cell diameter can be tightened, toward a larger average diameter, whereby the average diameters of the seal and anode can may be increased accordingly, thereby to increase the size of the anode cavity. As suggested earlier, increasing the size of the anode cavity increases the amount of electroactive anodic zinc which can be packed into the cell, resulting in an increase in the absolute amount of useful electricity which can be extracted from a cell of a given IEC standard size.

Materials suitable for use as metal strip 84 include nickel plated steel. The steel layer can be, for example, cold rolled steel, cold rolled mild steel, or stainless steel. Other steels may be used as desired, so long as they exhibit suitable strength in combination with suitable forming capabilities. The nickel can be plated or clad onto the steel core layer. The nickel layers are preferably generally pure nickel. However, alloys of nickel are also acceptable, such as INCONEL (INCO alloy of nickel, a non-magnetic alloy); pure nickel with minor alloying elements (NICKEL 200 and related family of NICKEL 200 alloys such as NICKEL 201, etc.), all available from Huntington Alloys, a division of INCO Huntington, W. Va., USA. Some noble metals can also find use as plating, cladding etc., including for example, and without limitation, gold, silver, platinum, palladium, and the like.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. An air depolarized electrochemical button cell comprising:
   (a) an anode
   (b) a cathode including a cathode can;
   (c) a separator; and
   (d) an electrolyte,
said cathode can having been fabricated from a metal strip having a first thickness between opposing surfaces thereof, using a punch in combination with a female die, the female die comprising an initializing land, an upstanding elongate inner side wall, a cavity defined inwardly of the inner side wall, and a lip between the initializing land and the inner side wall, said cathode can having a bottom wall and a side wall, an overall height, and an overall diameter, said cathode can comprising properties resulting from:
   (i) urging the punch against an element of the metal strip and thus urging both the punch and the metal strip into the cavity in the female die such that the metal strip is disposed between a first outer surface of a side wall of the punch, and a second inner surface of the side wall of the female die, the metal thus being drawn about the lip of the female die, the lip of the female die comprising a first outer cross-sectional radius disposed toward the initializing land, and a second inner cross-sectional radius disposed toward the inner side wall, the first radius being disposed between the second radius and the initializing land, the second radius being smaller than the first radius and being disposed between the first radius and the inner side wall;

(ii) moving the punch, and the corresponding element of the metal strip, into the cavity such that the outer side wall of the punch comes into facing, and thus working, relationship with the inner side wall of the female die, the clearance between the respective inner and outer side walls being less than the thickness of the metal strip being drawn therebetween, whereby movement of the punch into the cavity and corresponding drawing of the metal strip, along with the punch, and into sliding engagement against the inner surface of the elongate side wall results in rubbing, surface-to-surface engagement of an outwardly-disposed surface of the metal strip against corresponding portions of the inner surface of the elongate side wall of the female die, thus drawing the metal strip, and working the surface of the metal strip against the elongate side wall, whereby the metal strip is under tension from movement of the punch and is simultaneously under compressive force of the combination of the inner surface of the side wall of the female die and the outer surface of the side wall of the punch, thereby making a cathode can precursor as an integral part of the metal strip, the cathode can precursor having a bottom wall, and a side wall extending upwardly from the bottom wall; and (iii) severing the cathode can precursor from the metal strip, thereby to form the cathode can.

2. An air depolarized electrochemical button cell as in claim 1, said cathode can further comprising properties resulting from cutting leading and trailing edges of the element transversely across the strip while retaining attachment of the element to the strip at opposing sides of the strip.

3. An air depolarized electrochemical button cell as in claim 1, smoothness of the outwardly-disposed surface of the metal strip having been increased by moving the punch into the cavity thus cold working the metal strip at the outwardly-disposed surface by both thinning the metal and bending the metal.

4. An air depolarized electrochemical button cell as in claim 1, the bottom wall of the cathode can precursor having a second thickness, the side wall of the cathode can precursor having a third thickness, no more than about 85 percent as great as the second thickness.

5. An air depolarized electrochemical button cell as in claim 1 wherein the metal strip comprises first and second layers comprising nickel, and a layer of steel between the nickel layers.

6. An air depolarized electrochemical button cell as in claim 1, the cathode can comprising a post-plating material, applied after the severing of the cathode can precursor from the metal strip, whereby the worked outwardly-disposed surface is plated with the plating material.

7. An air depolarized electrochemical button cell as in claim 1 wherein the ratio of the second radius to the first radius is about 2/1 to about 8/1.

8. An air depolarized electrochemical button cell as in claim 1 wherein the ratio of the second radius to the first radius is about 3/1 to about 6/1.

9. An air depolarized electrochemical button cell as in claim 1 wherein the ratio of the second radius to the first radius is about 4/1.

10. An air depolarized electrochemical button cell as in claim 1 wherein the ratio of the clearance between the punch and the female die to the thickness of the metal strip was about 0.5/1 to about 0.85/1 before the punch was urged against the metal strip.

11. An air depolarized electrochemical button cell as in claim 1, the metal strip having had a hardness of about 93 to about 117 on the Vickers scale prior to being worked in said cavity.

12. An air depolarized electrochemical button cell as in claim 1, that portion of the metal strip which was cold worked in the cavity having had a hardness of about 130 to about 185 on the Vickers scale.

13. An air depolarized electrochemical button cell as in claim 1 wherein substantially the full height of the can has been defined in a single fabrication step.

14. An air depolarized electrochemical button cell as in claim 1 wherein the can has been fabricated using only steps wherein a punch moves toward a female die.

15. An air depolarized electrochemical button cell as in claim 1 wherein substantially the full height of the can has been defined in a single fabrication step of drawing and ironing, starting from a flat work piece element.

16. An air depolarized electrochemical button cell as in claim 1 wherein said cathode can has been ironed only in combination with drawing.

17. An air depolarized electrochemical button cell as in claim 1 wherein said cathode can has been ironed simultaneously over substantially the full height of the side wall.

18. An air depolarized electrochemical button cell comprising:
(a) an anode;
(b) a cathode including a cathode can;
(c) a separator; and
(d) an electrolyte, said cathode can having been fabricated from a metal strip having a first thickness between opposing surfaces thereof, using a punch in combination with a female die, the female die comprising an initializing land, an upstanding inner side wall, a cavity defined inwardly of the inner side wall, and a lip between the initializing land and the inner side wall, said cathode can having a bottom wall and a side wall, an overall height, and an overall diameter, said cathode can comprising properties resulting from:

(i) cutting leading and trailing edges of a metal workpiece element in the metal strip, transversely across a length of the strip, while retaining attachment of the element to the strip;

(ii) urging the punch against the workpiece element of the metal strip and thus urging both the punch and the metal strip into the cavity in the female die such that the metal strip is disposed between a first outer surface of a side wall of the punch, and a second inner surface of the side wall of the female die, the metal thus being drawn about the lip of the female die;

(iii) moving the punch, and the corresponding element of the metal strip, into the cavity such that the outer side wall of the punch comes into facing, and thus working, relationship with the inner side wall of the female die, the clearance between the respective inner and outer side walls being less than the thickness of the metal strip being worked therebetween, whereby movement of the punch into the cavity and corresponding drawing of the metal strip, along with the punch, and into sliding engagement against the inner surface of the side wall results in rubbing, surface-to-surface engagement of an outwardly-disposed surface of the metal strip against corresponding portions of the inner surface of the female die, thus working the surface of the metal strip, thereby making a cathode can precursor as an integral part of the metal strip; and (iv) severing the cathode can precursor from the metal strip, thereby to form the cathode can.

19. An air depolarized electrochemical button cell as in claim 18 smoothness of the outwardly-disposed surface of the metal strip having been increased by moving the punch into the cavity thus cold working the metal strip at the outwardly-disposed surface by both thinning the metal and bending the metal.

20. An air depolarized electrochemical button cell as in claim 18, the cathode can comprising a post-plating material applied after the severing of the cathode precursor from the metal strip, whereby the worked outwardly-disposed surface is plated with the plating material.

21. An air depolarized electrochemical button cell as in claim 18 wherein the ratio of the clearance between the punch and the female die to the thickness of the metal strip was about 0.5/1 to about 0.85/1 before the punch was urged against the metal strip.

22. An air depolarized electrochemical button cell as in claim 18, the metal strip having had a hardness of about 93 to about 117 on the Vickers scale prior to being worked in said cavity.

23. An air depolarized electrochemical button cell as in claim 18, that portion of the metal strip which was cold worked in the cavity having had a hardness of about 130 to about 185 on the Vickers scale.

24. An air depolarized electrochemical button cell as in claim 18 wherein substantially the full height of the can has been defined in a single fabrication step.

25. An air depolarized electrochemical button cell as in claim 18 wherein the can has been fabricated using only steps wherein a punch moves toward a female die.

26. An air depolarized electrochemical button cell as in claim 18 wherein substantially the full height of the can has been defined in a single fabrication step of drawing and ironing, starting from a flat work piece element.

27. An air depolarized electrochemical button cell as in claim 18 wherein said cathode can has been ironed only in combination with drawing.

28. An air depolarized electrochemical button cell as in claim 18 wherein said cathode can has been ironed simultaneously over substantially the full height of the side wall.

29. An air depolarized electrochemical button cell as in claim 18 wherein the lip of the female die comprises a first outer cross-sectional radius disposed toward the initializing land, and a second inner cross-sectional radius disposed toward the inner side wall, the first radius being disposed between the second radius and the initializing land, the second radius being disposed between the first radius and the inner side wall.

* * * * *